US009669353B2

(12) United States Patent
Naito

(10) Patent No.: US 9,669,353 B2
(45) Date of Patent: Jun. 6, 2017

(54) METHOD AND APPARATUS FOR PREVENTING CORROSION OF COMPRESSOR IMPURITY SEPARATION MECHANISM

(71) Applicant: IHI Corporation, Tokyo (JP)

(72) Inventor: Toshiyuki Naito, Tokyo (JP)

(73) Assignee: IHI Corporation, Tokyo (JP)

( * ) Notice: Subject to any disclaimer, the term of this patent is extended or adjusted under 35 U.S.C. 154(b) by 15 days.

(21) Appl. No.: 14/844,135

(22) Filed: Sep. 3, 2015

(65) Prior Publication Data

US 2015/0375167 A1  Dec. 31, 2015

Related U.S. Application Data

(63) Continuation of application No. PCT/JP2014/061533, filed on Apr. 24, 2014.

(30) Foreign Application Priority Data

Apr. 30, 2013 (JP) .................................. 2013-094996

(51) Int. Cl.
*C23F 11/02* (2006.01)
*C23F 11/18* (2006.01)
*C23F 15/00* (2006.01)
*B01D 53/50* (2006.01)
*B01D 53/62* (2006.01)
(Continued)

(52) U.S. Cl.
CPC ......... *B01D 53/507* (2013.01); *B01D 53/504* (2013.01); *B01D 53/75* (2013.01); *B01D 53/79* (2013.01); *C01B 31/20* (2013.01); *F04B 39/16* (2013.01); *B01D 2251/2062* (2013.01); *B01D 2251/304* (2013.01); *B01D 2251/402* (2013.01); *B01D 2251/604* (2013.01); *B01D 2256/22* (2013.01); *B01D 2257/302* (2013.01);
(Continued)

(58) Field of Classification Search
CPC  C23F 11/02; C23F 11/18; C23F 15/00; C23F 15/005; B01D 53/002; B01D 53/50; B01D 53/62; B01D 53/74; B01D 53/75
See application file for complete search history.

(56) References Cited

U.S. PATENT DOCUMENTS 3,343,908 A * 9/1967 Wickert .................... C10L 1/12
                                                          252/373
3,490,926 A * 1/1970 Lee .......................... C09D 1/00
                                                          106/14.21
(Continued)

FOREIGN PATENT DOCUMENTS

JP    2002-273159    9/2002
JP    2006-263676    10/2006
(Continued)

OTHER PUBLICATIONS

U.S. Appl. No. 14/963,925, filed Dec. 9, 2015, Naito.
(Continued)

*Primary Examiner* — Timothy Vanoy
(74) *Attorney, Agent, or Firm* — Oblon, McClelland, Maier & Neustadt, L.L.P.

(57) ABSTRACT

An alkalinity control agent is sprayed upstream of a compressor in a first impurity separator to discharge impurities containing at least sulfur oxides in exhaust gas together with drain from an aftercooler in the first impurity separator.

7 Claims, 3 Drawing Sheets

(51) Int. Cl.
*B01D 53/74* (2006.01)
*B01D 53/75* (2006.01)
*C01B 31/20* (2006.01)
*F04B 39/16* (2006.01)
*B01D 53/79* (2006.01)
*F04D 29/58* (2006.01)

(52) U.S. Cl.
CPC ........... *B01D 2258/0283* (2013.01); *B01D 2259/4566* (2013.01); *F04D 29/5826* (2013.01)

(56) References Cited

U.S. PATENT DOCUMENTS

| | | | | |
|---|---|---|---|---|
| 4,168,291 | A * | 9/1979 | Libutti | C23F 15/00 |
| | | | | 110/343 |
| 4,185,071 | A * | 1/1980 | Sujdak | C23F 11/02 |
| | | | | 110/343 |
| 4,206,172 | A * | 6/1980 | Sujdak | C23F 11/02 |
| | | | | 110/343 |
| 4,224,180 | A * | 9/1980 | Sujdak | C10L 1/22 |
| | | | | 110/343 |
| 9,149,765 | B2 * | 10/2015 | Naito | C01B 31/20 |
| 9,149,766 | B2 * | 10/2015 | Naito | B01D 53/56 |
| 2005/0131125 | A1 * | 6/2005 | Kohara | C23F 15/00 |
| | | | | 524/439 |
| 2007/0122328 | A1 | 5/2007 | Allam et al. | |
| 2008/0226515 | A1 | 9/2008 | Allam et al. | |
| 2012/0014861 | A1 | 1/2012 | Hirata et al. | |
| 2013/0319040 | A1 | 12/2013 | Naito | |
| 2014/0150652 | A1 * | 6/2014 | Bedell | B01D 53/1425 |
| | | | | 95/181 |

FOREIGN PATENT DOCUMENTS

| | | |
|---|---|---|
| JP | 2007-145709 | 6/2007 |
| JP | 2010-241630 | 10/2010 |
| JP | 2012-106163 | 6/2012 |
| JP | 2012-143699 | 8/2012 |
| WO | WO 2012/107953 | 8/2012 |
| WO | WO 2014/057652 | 4/2014 |
| WO | WO 2014/064894 | 5/2014 |

OTHER PUBLICATIONS

U.S. Appl. No. 14/939,174, filed Nov. 12, 2015, Naito.
U.S. Appl. No. 14/941,774, filed Nov. 16, 2015, Naito.
International Search Report issued Aug. 5, 2014, in PCT/JP2014/061533 filed Apr. 24, 2014.
U.S. Appl. No. 14/844,694, filed Sep. 3, 2015, Naito.

* cited by examiner

METHOD AND APPARATUS FOR PREVENTING CORROSION OF COMPRESSOR IMPURITY SEPARATION MECHANISM

TECHNICAL FIELD

The present disclosure relates to a method and an apparatus for preventing corrosion of compressor-based impurity separation mechanism adapted to prevent compressors from being corroded when impurities in exhaust gas mainly composed of carbon dioxide ($CO_2$) from an oxyfuel combustor are removed using the compressors.

BACKGROUND ART

Recently an oxyfuel combustor has been reviewed as one of techniques for treating carbon dioxide ($CO_2$) which is said to be one of factors for global warming, and attention has been attracted to, for example, a coal-fired boiler for oxyfuel combustion of pulverized coal. It has been conceived in such coal-fired boiler that oxygen in lieu of air is used as an oxidizing agent to produce combustion exhaust gas mainly composed of carbon dioxide ($CO_2$) and such exhaust gas with high $CO_2$ concentration is compressed and cooled into liquefied carbon dioxide; such liquefied carbon dioxide is transported by a vessel, a vehicle or other carrying means to a destination for storage thereof in the ground or alternatively the liquefied carbon dioxide increased in pressure is transported through a pipeline to a destination for storage thereof in the ground.

Such exhaust gas from the coal-fired boiler for oxyfuel combustion contains, in addition to carbon dioxide ($CO_2$), impurities derived from coal feedstock such as nitrogen oxides ($NO_x$), sulfur oxides ($SO_x$), hydrargyrum (Hg), hydrogen chloride (HCl) and dust.

Among the above-mentioned impurities, sulfur oxides ($SO_x$) may be contacted with and dissolved in water into sulfuric acid ($H_2SO_4$) and hydrogen chloride (HCl) may be dissolved in water into hydrochloric acid, so that such water-soluble sulfur oxide and hydrogen chloride as well as dust may be disunited through contact with water.

Among the nitrogen oxides ($NO_x$) as the above-mentioned impurities, nitrogen dioxide ($NO_2$) may be contacted with and dissolved in water into nitric acid ($HNO_3$) to become disunited. However, the exhaust gas from the coal-fired boiler has less oxygen ($O_2$) so that nitrogen ($N_2$) exists substantially in the form of nitrogen monoxide (NO) which is water-insoluble and thus is unremovable by water spraying or the like.

The above-mentioned sulfuric acid, hydrochloric acid and nitric acid are known to corrode instruments in the exhaust gas treatment device; hydrargyrum, which is trace metal, is known to hurt low-temperatured aluminum members constituting a heat exchanger. Thus, it is preferable to remove these impurities in the exhaust gas at early stages. There is also a problem that admixture of the impurities into the exhaust gas lowers a purity degree of the carbon dioxide, which makes troublesome the liquefaction of the carbon dioxide through compression and cooling and thus requires larger-sized equipment therefor. Thus, in a coal-fired boiler for oxyfuel combustion or other system where exhaust gas mainly composed of carbon dioxide is produced and the carbon dioxide is disposed, it is extremely important to remove impurities in the exhaust gas.

Thus, it has been conducted, for example, in the coal-fired boiler for oxyfuel combustion that a spray-column-type, packed-column-type or other wet desulfurizer used in a conventional air-fired boiler or the like is provided to remove sulfur oxides which are especially problematic in corrosion. Moreover, nitrogen and nitrogen oxides derived from coal feedstock are produced in the exhaust gas from the coal-fired boiler for oxyfuel combustion or the like, so that it has been conducted that a catalyst-type or other denitrator is arranged upstream of the desulfurizer to remove the nitrogen and nitrogen oxides.

It is known in the wet desulfurizer as mentioned in the above that sulfur oxides and hydrogen chloride as well as dust are removed and that nitrogen oxides are partly removed and hydrargyrum, which is inherently low in content, is slightly removed. It has been also conceived that if hydrargyrum in the exhaust gas is still high in concentration even after the above-mentioned exhaust gas treatment is conducted, a hydrargyrum-removing column is arranged to remove the hydrargyrum by adsorbent or the like.

As mentioned in the above, exhaust gas mainly composed of carbon dioxide ($CO_2$) from a coal-fired boiler for oxyfuel combustion usually undergoes compression by a plurality of compressors, cooling by aftercoolers respectively downstream of the respective compressors and liquefaction into liquefied carbon dioxide by cooling using a heat exchanger. In this case, there is a problem that the compressors may be corroded by sulfuric acid ($H_2SO_4$) specifically resulting from sulfur oxides ($SO_x$) included in the exhaust gas. It is a very important task to prevent the compressors, which are extremely costly, form being corroded.

An exhaust gas treatment system comprises, for example, a duct for guidance of exhaust gas from a boiler which burns fuel with combustion gas, i.e., a mixture of oxygen-rich gas with circulated exhaust gas, the duct being provided with a dust collector and a wet desulfurizer, an exhaust gas recirculation duct for guidance of part of the exhaust gas downstream of the dust collector to the boiler, $CO_2$ separation means for compression of the exhaust gas downstream of the desulfurizer to separate carbon dioxide, water separated in the compression of the exhaust gas by the $CO_2$ separation means being supplied to absorbing liquid used in circulation in the desulfurizer (see Patent Literature 1).

In addition, there are exhaust gas treatment systems disclosed in Patent Literatures 2-5.

CITATION LIST

Patent Literature

[Patent Literature 1] JP 2012-143699A
[Patent Literature 2] WO 2012-107953A
[Patent Literature 3] JP 2007-1455709A
[Patent Literature 4] JP 2002-273159A
[Patent Literature 5] JP 2006-263676A

SUMMARY

Technical Problems

However, the conventional exhaust gas treatment system has problems that equipment for removal of impurities in exhaust gas becomes extreme large in size, complicated in structure and increased in installation cost since impurities and specifically sulfur oxides ($SO_x$) in the exhaust gas are removed by a spray-column type or other wet desulfurizer in a conventional exhaust gas treatment system as shown in Patent Literature 1.

Thus, a technique has been demanded which can remove sulfur oxides in the exhaust gas guided to the compressors at a low cost, using simple equipment, to thereby prevent the compressors from being corroded.

The disclosure was made in view of the above and has its object to provide a method and an apparatus for preventing corrosion of a compressor-based impurity separation mechanism which can prevent a problem of compressors being corroded by sulfur oxides in exhaust gas from an oxyfuel combustor, using simple equipment, at low cost.

Solution to Problems

The disclosure is directed to an apparatus for preventing corrosion of a compressor-based impurity separation mechanism wherein impurities in exhaust gas mainly composed of carbon dioxide from an oxyfuel combustor are removed, before supplying of the exhaust gas to a carbon dioxide liquefier, by the compressor-based impurity separation mechanism comprising a plurality of impurity separators having a plurality of compressors for stepwise compressing carbon dioxide up to a target pressure for liquefaction thereof and aftercoolers for cooling the exhaust gas compressed by the respective compressors, water condensed by the cooling being discharged as drain, the apparatus comprising an alkalinity control agent supply unit which comprises a nozzle for spraying an alkalinity control agent upstream of a compressor in a first one of the impurity separators to remove impurities containing at least sulfur oxides in the exhaust gas and a supply pump for supplying an alkalinity control agent stored in an supply tank to said nozzle through a filter.

It is preferable in the apparatus for preventing corrosion of the compressor-based impurity separation mechanism that said alkalinity control agent supply unit has a pH sensor for detecting pH of drain in a drain tank which stores the drain from the aftercooler in said first impurity separator, and a controller for controlling a supply amount of the alkalinity control agent by said supply pump so as to keep the pH value detected by said pH sensor to a preliminarily set value.

Further, it is preferable in the apparatus for preventing corrosion of the compressor impurity separation mechanism that said alkalinity control agent supply unit has a mixing pump for mixing the alkalinity control agent from said supply tank by the supply pump with the drain from a drain tank to supply a resultant mixture to said nozzle.

Further, it is preferable in the apparatus for preventing corrosion of the compressor impurity separation mechanism that the controller is configured such that a detected value of sulfur oxides from an impurity sensor arranged downstream of the aftercooler in a downstream one of the impurity separators is inputted, and a supply of the alkalinity control agent by said alkalinity control agent supply unit is increased when the detected value of sulfur oxides from the impurity sensor exceeds a preliminarily set value.

The disclosure is directed to a method for preventing corrosion of a compressor-based impurity separation mechanism wherein impurities in exhaust gas mainly composed of carbon dioxide from an oxyfuel combustor are removed, before supplying of the exhaust gas to a carbon dioxide liquefier, by the compressor-based impurity separation mechanism comprising a plurality of impurity separators having a plurality of compressors for stepwise compressing carbon dioxide up to a target pressure for liquefaction thereof and aftercoolers for cooling the exhaust gas compressed by the respective compressors, water condensed by the cooling being discharged as drain, the method comprising spraying an alkalinity control agent upstream of the compressor in a first one of the impurity separators, and discharging impurities containing at least sulfur oxides in the exhaust gas together with drain from the aftercooler in the first impurity separator.

It is preferable in the method for prevention corrosion of the compressor-based impurity separation mechanism that the alkalinity control agent is supplied such that a detected pH value in the drain from the aftercooler in said first impurity separator is 5 or more.

Advantageous Effects

A method and an apparatus for preventing corrosion of a compressor-based impurity separation mechanism according to the disclosure can exhibit an excellent effect that a problem of compressors being corroded by sulfur oxides or other impurities contained in exhaust gas from an oxyfuel combustor can be prevented at a low cost, using simple equipment.

DESCRIPTION OF EMBODIMENTS

Next, embodiments of the disclosure will be described in conjunction with the drawings.

Figure 1:
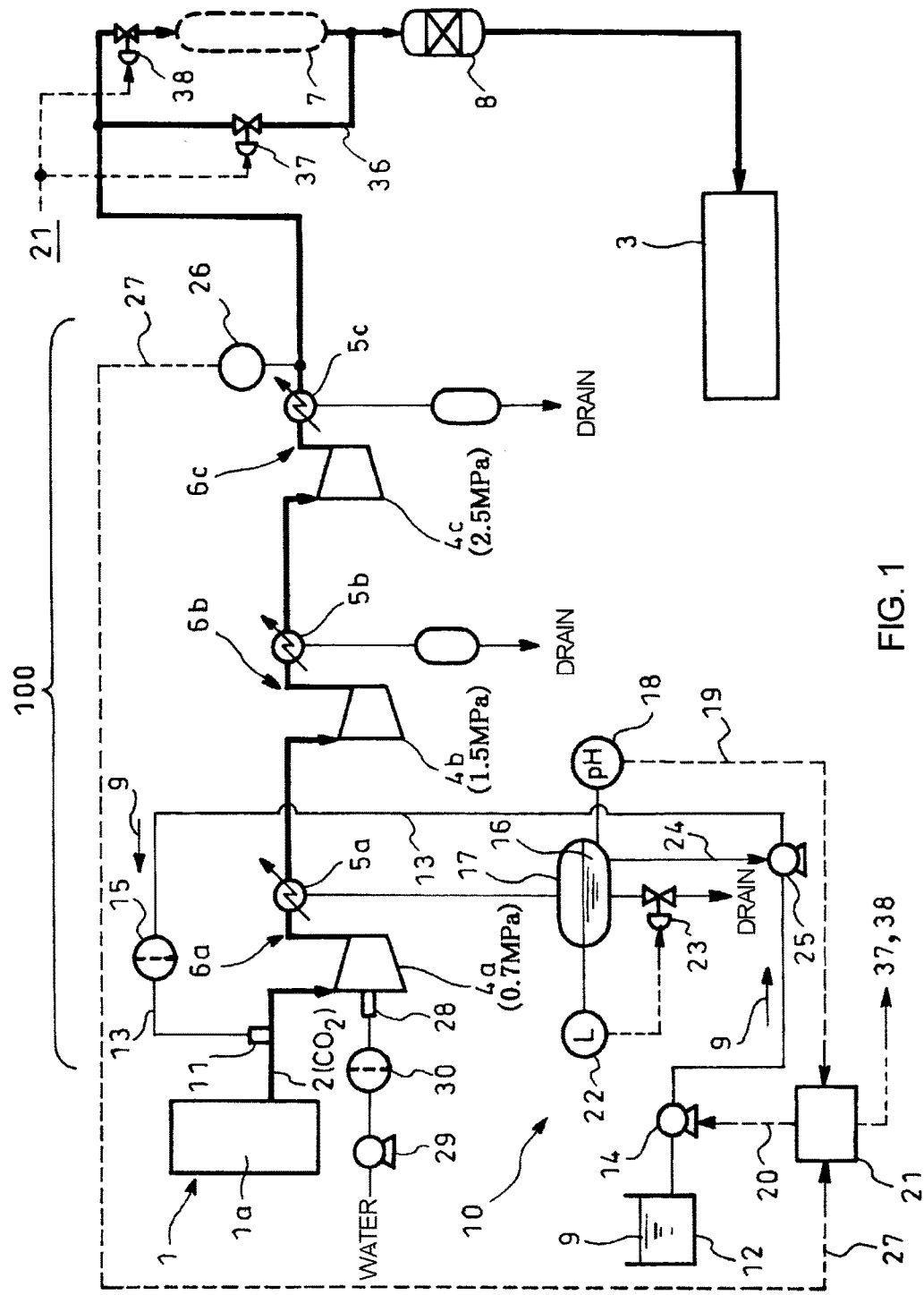
FIG. 1 is a systematic diagram showing an embodiment of an apparatus for preventing corrosion of a compressor-based impurity separation mechanism provided for an oxyfuel combustor according to the disclosure.

FIG. 1 is a systematic diagram showing an embodiment of an apparatus for preventing corrosion of a compressor-based impurity separation mechanism 100 according to the disclosure provided for an oxyfuel combustor. In FIG. 1, reference numeral 1 denotes the oxyfuel combustor comprising, for example, a coal-fired boiler 1a for oxyfuel combustion of pulverized coal. Discharged from the oxyfuel combustor 1 is exhaust gas 2 mainly composed of carbon dioxide ($CO_2$). Arranged upstream of a carbon dioxide liquefier 3 to which such exhaust gas 2 mainly composed of carbon dioxide from the oxyfuel combustor 1 is supplied for liquefaction is the compressor-based impurity removal mechanism 100 adapted to compress the exhaust gas 2 up to a target pressure, i.e., a pressure required for liquefaction in the liquefier 3 or a predetermined pressure approximate to the required pressure, to remove impurities in the exhaust gas 2.

The compressor impurity separation mechanism 100 shown in FIG. 1 comprises a plurality of (three in the embodiment illustrated) impurity separators 6a, 6b and 6c comprising a plurality of compressors 4a, 4b and 4c for compression of the exhaust gas 2 from the oxyfuel combustor 1 stepwise up to the target pressure and aftercoolers 5a, 5b and 5c (coolers) for downstream cooling of the exhaust gas 2 compressed in the respective compressors 4a, 4b and 4c to discharge water condensed by the cooling as drain. Generally, a cooler arranged between the compressors is called as intercooler; however, for ease of explanation, all of the coolers in the disclosure are explained as aftercoolers 5a, 5b and 5c.

Operations of the impurity separators 6a, 6b and 6c for liquefaction of carbon dioxide under various temperature and pressure conditions were studied to find out that a summed operational energy of the compressors 4a, 4b and 4c and carbon dioxide liquefier 3 is lowest when carbon dioxide is increased in pressure up to 2.5 MPa and temperature is lowered to −30° C. prior to the supply of the carbon dioxide to the liquefier 3. Thus, 2.5 MPa is set as a target pressure. Here, the target pressure of 2.5 MPa is a rough standard since temperature and pressure set to the impurity separators 6a, 6b and 6c may vary depending on components and water content of the exhaust gas 2 and carrying means (carrying vessel or the like). Cooling below −40° C., for which unusable is an alternative chlorofluorocarbon coolant in general, requires an ammonia refrigerator, disadvantageously resulting in increase in installation cost; it is thus preferable that the cooling temperature by the aftercooler 5 is set to −30° C.

It is not efficient to pressurize the exhaust gas 2 up to the target pressure of 2.5 MPa all at once by a single compressor 4. Thus, in the embodiment, the three compressors 4a, 4b and 4c are arranged for three-step compressions into 0.75 MPa, 1.5 MPa and 2.5 MPa and thus provides the impurity separators 6a, 6b and 6c. The number of the compressors 4a, 4b and 4c (the number of the impurity separators 6a, 6b and 6c) may be any including 4 or more.

With the pressures set as mentioned in the above, almost all of the water in the exhaust gas 2 is discharged as drain in the first impurity separator 6a; a small amount of drain is discharged in the middle impurity separator 6b; and a smaller amount of drain is discharged in the last impurity separator 6c.

According to the compressor impurity separation mechanism 100, almost all of the impurities in the exhaust gas 2 can be removed. When a concentration of hydrargyrum (Hg) in the carbon dioxide having passed through the compressor-based impurity separation mechanism 100 is higher than its target value, a hydrargyrum-removing column 7 is arranged downstream of the impurity separation mechanism 100 to remove hydrargyrum, using an adsorbent or the like (the hydrargyrum-removing column 7 is shown in broken line in FIG. 1). Provided for the hydrargyrum-removing column 7 is a bypass duct 36 for changeover by a command from the controller 21 through changeover valves 37 and 38 between flows of the exhaust gas 2 passing and not passing through the hydrargyrum-removing column 7. Arranged on an entry side of the carbon dioxide liquefier 3 is a dryer 8 for removal of water in the carbon dioxide to be supplied to the carbon dioxide liquefier 3.

The compressor-based impurity separation mechanism 100 shown in FIG. 1 is provided with an alkalinity control agent supply unit 10 for supply of an alkalinity control agent 9 to the exhaust gas 2 on an entry (upstream) side of the compressor 4a in the first impurity separator 6a. The alkalinity control agent supply unit 10 comprises a nozzle 11 for spray of the alkalinity control agent 9 to the exhaust gas 2 on an entry side of the compressor 4a in the first impurity separator 6a, a supply tank 12 for storage of the alkalinity control agent 9 and a supply pump 14 for supply of the alkalinity control agent 9 from the supply tank 12 through a supply pipe 13 to the nozzle 11. The nozzle 11 may be arranged at any position between the coal-fired boiler 1a and the first compressor 4a and on the entry (upstream) side of the compressor 4a.

Incorporated in the supply pipe 13 upstream of the nozzle 11 is a filter 15 for removal of minute solids in the alkalinity control agent 9 to prevent a small-diameter injection port in the nozzle 11 from being clogged by the solids.

Usable as the alkalinity control agent 9 is, for example, sodium hydrate (NaOH), ammonia (—NH$_3$), magnesium hydrate (Mg(OH)$_2$) or plenty of water (H$_2$O) (water in general is mildly alkaline).

The alkalinity control agent supply unit 10 further comprises a drain tank 17 for storage of an amount of drain 16 from the aftercooler 5a in the first impurity separator 6a, a pH sensor 18 for detection of pH of the drain 16 stored in the drain tank 17 and a controller 21 for outputting of a control signal 20 to the supply pump 14 to control a supply amount of the alkalinity control agent 9 so as to keep a pH value 19 detected by the pH sensor 18 to a predetermined set value. The drain tank 17 is provided with a level controller 22 which controls an opening degree of a discharge valve 23 on a drain discharge (downstream) side of the drain tank 17 so as to always keep the detected value to a constant value.

Arranged on an exit (downstream) side of the supply pump 14 in the supply pipe 13 for supply of the alkalinity control agent 9 from the supply tank 12 is a mixing pump 25 which mixes the alkalinity control agent 9 in the supply pipe 13 with the drain 16 from the drain tank 17 through a discharge pipe 24 and supplies the mixed alkalinity control agent 9 to the nozzle 11.

The controller 21 controls the supply of the alkalinity control agent 9 by the supply pump 14 such that a pH value detected by a pH sensor 18 for detection of pH in the drain 16 on an exit side of the aftercooler 5a in the first impurity separator 6a is kept to, for example, 5 or more.

Arranged on an exit (downstream) side of the aftercooler 5c in the last impurity separator 6c where the exhaust gas 2 is discharged is an impurity sensor 26 for detection of impurities (e.g., sulfur oxides) in the exhaust gas 2, and an impurity value 27 detected in terms of sulfur oxides by the impurity sensor 26 is inputted to the controller 21 which in turn conducts an emergency control to increase the supply amount of the alkalinity control agent 9 by the alkalinity control agent supply unit 10 when the impurity value 27 detected in terms of sulfur oxides by the impurity sensor 26 exceeds a predetermined set value. The exit side of the aftercooler 5c is preferable as a position of the impurity sensor 26 for quick detection of the impurities in the exhaust gas 2; alternatively, it may be arranged at any position downstream of the aftercooler 5c and between the aftercooler 5c and the dryer 8 (or the hydrargyrum-removing column 7).

The compressor 4a in the first impurity separator 6a has an exhaust gas 2 intake portion provided with a water injection nozzle 28 for injection of water from a pump 29 through a filter 30. When any substances adhere on blades in the compressor 4a by supplying the alkalinity control agent 9 upstream of the compressor 4a, the operation of the compressor 4a is stopped and high-pressure water is injected by the water injection nozzle 28 to wash the blades in the compressor 4a.

Next, mode of operation of the above embodiment will be described.

The exhaust gas 2 mainly composed of carbon dioxide resulting from the oxyfuel combustion in the oxyfuel combustor 1 is guided with a pressure of, for example, 0.1 MPa (one atmosphere of pressure) to the compressor 4a in the first impurity separator 6a in the compressor impurity separation mechanism 100 and is pressurized by the compressor 4a to 0.7 MPa. The exhaust gas 2 pressurized by the compressor 4a to 0.7 MPa is supplied to and cooled by the adjacent aftercooler 5a from which drain is discharged in large quantity. In this case, the drain from the first aftercooler 5a dissolves the water-soluble impurities, i.e., sulfur oxides and hydrogen chloride and dust in the exhaust gas 2 to effectively remove the same. Specifically, the water-soluble impurities, i.e., sulfur oxides and hydrogen chloride are removed in a high removal ratio together with the drain 16 discharged in large quantity from the first aftercooler 5a.

The exhaust gas 2 cooled by the aftercooler 5a is guided to and pressurized by the compressor 4b in the downstream (succeeding) impurity separator 6b to 1.5 MPa. The exhaust gas 2 pressurized to 1.5 MPa is cooled by the adjacent aftercooler 5b from which drain is discharged in an amount smaller than that from the aftercooler 5a. And, with the pressure being elevated by the compressor 4b, also in the downstream aftercooler 5b, part of sulfur oxides and hydrogen chloride is removed together with the small amount of drain.

The exhaust gas 2 cooled by the aftercooler 5b is guided to and pressurized by the compressor 4c in the last impurity separator 6c to 2.5 MPa. The exhaust gas 2 compressed by the compressor 4c to 2.5 MPa is cooled by the adjacent aftercooler 5c, and drain is discharged from the aftercooler 5c in an amount still smaller than that in the aftercooler 5b. And, with the pressure being further elevated by the compressor 4c, also in the last aftercooler 5c, part of sulfur oxides and hydrogen chloride is removed together with the still smaller amount of drain.

The exhaust gas 2 guided to the last aftercooler 5c in the last impurity separator 6c has been pressurized stepwisely by the compressors 4a, 4b and 4c up to 2.5 MPa, so that nitrogen monoxide (NO) in the exhaust gas 2 is changed into water-soluble nitrogen dioxide ($NO_2$) owing to accelerated oxidization through the pressurization. Thus, drain with nitrogen oxides dissolved is discharged from the aftercooler 5c in the last impurity separator 6c, so that nitrogen oxides in the exhaust gas 2 are removed with a high removal ratio. The respective drains including impurities separated by the respective aftercoolers 5a, 5b and 5c are supplied to a drainage treatment equipment for disposal.

In the respective compressors 4a, 4b and 4c, there is a problem of blades and the like being corroded under influence of sulfuric acid produced due to dissolution of sulfur oxides in the water resulting from the compression of the exhaust gas 2.

Thus, in the compressor impurity separation mechanism 100 shown in FIG. 1, the alkalinity control agent 9 is sprayed by alkalinity control agent supply unit 10 to the exhaust gas 2 on the entry (upstream) side of the compressor 4a in the first impurity separator 6a. The alkalinity control agent supply unit 10 supplies the alkalinity control agent 9 in the supply tank 12 by the supply pump 14 through the supply pipe 13 to the nozzle 11 on the entry side of the compressor 4a. In this case, the controller 21 controls the supply pump 14 to control the supply amount of the alkalinity control agent 9 so as to keep the detected pH value 19 from the pH sensor 18 for detection of pH in the drain 16 in the drain tank 17 to the preliminarily set value. By the mixing pump 25 provided in the supply pipe 13 on the discharge side of the supply pump 14, the drain 16 partly discharged from the drain tank 17 through the discharge pipe 24 is mixed with the alkalinity control agent 9. Thus, the alkalinity control agent 9 from the drain tank 17 is diluted by the drain 16 into a predetermined concentration with a predetermined pH value and is supplied to the nozzle 11.

The sulfur oxides in the exhaust gas 2 is dissolved in the drain 16, so that the pH value 19 detected by the pH sensor 18 for detection of pH in the drain 16 substantially lowers (for example, into pH of 1), so that the drain 16 becomes saturated and sulfur oxides can be dissolved in the drain 16 no more. Thus, the controller 21 controls the supply amount of the alkalinity control agent 9 to the nozzle 11 such that the detected pH value 19 in the drain 16 from the first aftercooler 5a is kept to the set value of pH 5 or more.

By such supply by the controller 21 of the alkalinity control agent 9 to keep the detected pH value 19 in the drain 16 from the aftercooler 5a to pH 5 or more, most of the sulfur oxides in the exhaust gas 2 are dissolved in the drain 16 and are removed.

The inventors conducted a simulation test for obtaining a relationship between an added amount (kg/hr) of sodium hydrate (NaOH) which is the alkalinity control agent 9 supplied on the entry side of the compressor 4a in the first impurity separator 6a and a sulfur oxides ($SO_2$) removal ratio. The result is as shown in FIG. 2.

Figure 2:
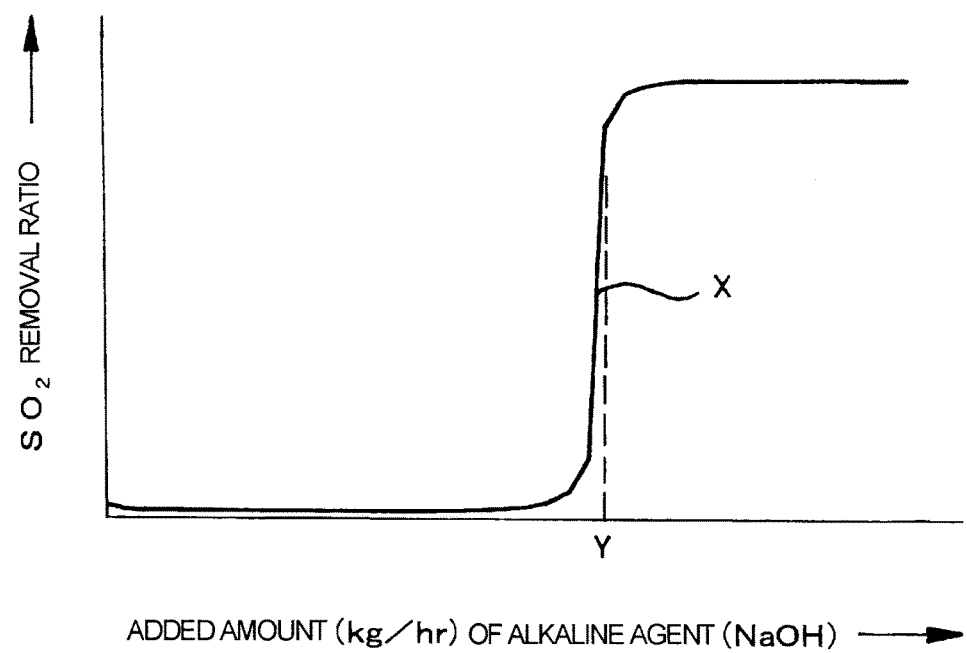
FIG. 2 is a diagram showing a relationship between a supply amount of an alkalinity control agent supplied upstream of a compressor in a first impurity separator and a sulfur oxides removal ratio.

As shown in FIG. 2, it was revealed from the above-mentioned test that the sulfur oxides removal ratio is more or less 2% when the added amount of the alkalinity control agent 9 is little and that the sulfur oxides removal ratio is abruptly increased up to 98% when the added amount of the alkalinity control agent 9 is increased to Y, i.e., approximate 2.4 (kg/hr). It is conjectured that the tendency of the sulfur oxides removal ratio is similarly applicable to a removal ratio of hydrogen chloride. And, when the added amount Y of the alkalinity control agent 9 was 2.7 (kg/hr), the drain 16 had pH of substantially 5. Thus, it was revealed that when the alkalinity control agent 9 is supplied by alkalinity control agent supply unit 10 so as to keep the detected pH value 19 of the drain 16 from the drain tank 17 to pH 5 or more, water-soluble impurities comprising sulfur oxides and hydrogen chloride which are said to be especially highly corrosive can be effectively removed at an extremely high removal ratio.

The alkalinity control agent supply unit 10 sprays the alkalinity control agent 9 on the entry side of the compressor 4a in the first impurity separator 6a. Thus, when sodium hydrate (NaOH) is used as the alkalinity control agent 9, a reaction of $SO_2+2NaOH \rightarrow Na_2SO_3+H_2O$ generates on the entry side of the compressor 4a. Thus, generation of sulfuric acid ($H_2SO_4$) in the compressor 4a is prevented, so that blades of the first compressor 4a can be prevented from being corroded. When ammonia (—$NH_3$), magnesium hydrate ($Mg(OH)_2$) or the like is used as the alkalinity control agent 9, generation of sulfuric acid can be similarly suppressed to prevent the blades of the compressor 4a from being corroded.

The spray of the alkalinity control agent 9 to the entry side of the compressor 4a in the first impurity separator 6a enhances pH in the exhaust gas 2 supplied to the compressors 4b and 4c in the downstream impurity separators 6b and 6c, so that corrosion of the downstream compressors 4b and 4c by sulfuric acid is also prevented.

Figure 3:
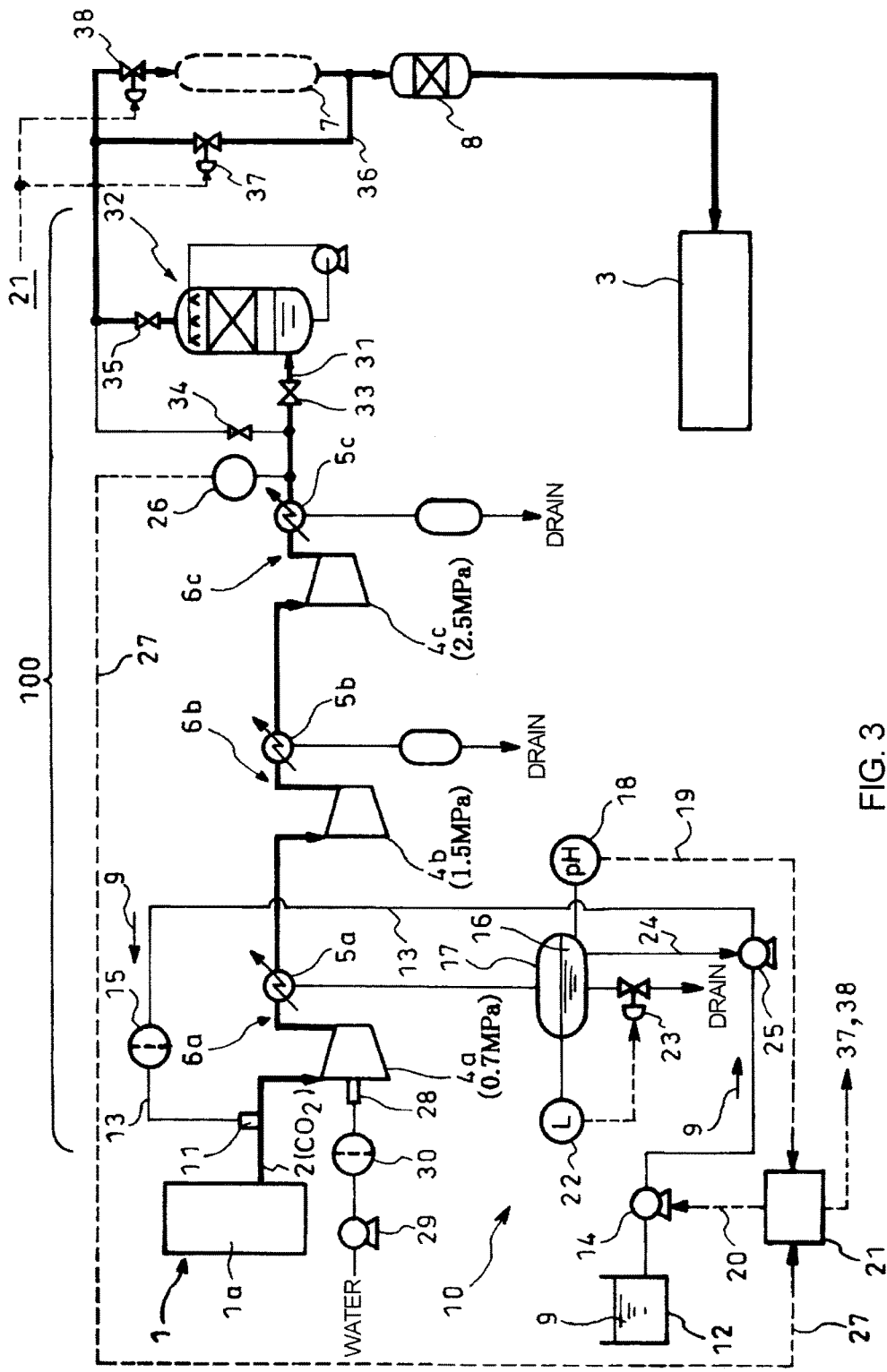
FIG. 3 is a systematic diagram showing a further embodiment of the apparatus for preventing corrosion of the compressor-based impurity separation mechanism according to the disclosure.

FIG. 3 is a systematic diagram showing a further embodiment of the apparatus for preventing corrosion of the compressor-based impurity separation mechanism 100 according to the disclosure. In this embodiment, a bypass duct 31 is arranged on a discharge (downstream) side of the last impurity separator 6c and thus downstream of the compressor impurity separation mechanism 100. The bypass duct 31 is provided with a wet desulfurization and denitration device 32 and further with changeover valves 33, 34 and 35 for changeover between flowing and non-flowing states of the exhaust gas 2 to the desulfurization and denitration device 32.

With the bypass duct 31 being provided with the desulfurization and denitration device 32, the exhaust gas 2 may be guided to the desulfurization and denitration device 32 as needs demand, so that the impurities in the exhaust gas 2 may be further reduced when the need arises. In this case, a flow rate of the exhaust gas 2 guided out from the compressor impurity separation mechanism 100 is extremely trifle because of the compression by the respective compressors 4a, 4b and 4c in the compressor impurity separation mechanism 100, so that the desulfurization and denitration device 32 used may be extremely small-sized (reduced in size to about one-several tenths in comparison with a conventional device).

As mentioned in the above, according to the apparatus for preventing corrosion of the compressor-based impurity separation mechanism 100 of the disclosure, the alkalinity control agent 9 is supplied upstream of the compressor 4a in the first impurity separator 6a to undergo the reaction with sulfur oxides in the exhaust gas 2, so that the impurities are discharged together with the drain 16 from the first aftercooler 5a. As a result, the problem of the first compressor 4a being corroded by sulfuric acid can be prevented. The spraying of the alkalinity control agent 9 to the entry side of the compressor 4a in the first impurity separator 6a increases pH in the exhaust gas 2 supplied to the compressors 4b and 4c in the downstream impurity separators 6b and 6c, so that the problem of the downstream compressors 4b and 4c being corroded by sulfuric acid is also prevented.

The supplying of the alkalinity control agent 9 so as to keep the detected pH value 19 of the drain 16 from the aftercooler 5a in the first impurity separator 6a to 5 or more stably maintains an effect of removing impurities in the first impurity separator 6a.

The alkalinity control agent supply unit 10 supplies the alkalinity control agent 9 through the filter 15 to the nozzle 11, so that the alkalinity control agent 9 can be always stably sprayed by the nozzle 11.

The alkalinity control agent supply unit 10 is provided with the controller 21 for controlling the supply amount of the alkalinity control agent 9 by the supply pump 14 such that the pH value 19 detected by the pH sensor 18 for detecting pH in the drain 16 stored in the drain tank 17 is kept to a predetermined set value. Thus, the exhaust gas 2 supplied to the first compressor 4a is kept to high pH, and thus an effect of highly removing the impurities can be stably attained.

The alkalinity control agent supply unit 10 supplies to the nozzle 11 the alkalinity control agent 9 supplied from the supply tank 12 by the supply pump 14, mixed with the drain 16 from the drain tank 17 by the mixing pump 25 and diluted for control of pH value, so that the alkalinity control agent 9 with high pH value can be stored in the supply tank 12 and thus the supply tank 12 with a reduced capacity can be used.

The detected value 27 of sulfur oxides from the impurity sensor 26 downstream of the aftercooler 5c in the last impurity separator 6c is inputted to the controller 21 which is adapted to increase the supply of the alkalinity control agent 9 by the alkalinity control agent supply unit 10 when the detected impurity value 27 of sulfur oxides exceeds the predetermined set value. Thus, the problem of the effect of removing impurities by the compressor-based impurity separation mechanism 100 being substantially lowered can be prevented from occurring.

It is to be understood that a method and an apparatus for preventing corrosion of a compressor-based impurity separation mechanism according to the disclosure are not limited to the above embodiments and that various changes and modifications may be made without departing from the scope of the disclosure.

REFERENCE SIGNS LIST 1 oxyfuel combustor
1a coal-fired boiler
2 exhaust gas
3 carbon dioxide liquefier
4a compressor
4b compressor
4c compressor
5a aftercooler
5b aftercooler
5c aftercooler
6a impurity separator
6b impurity separator
6c impurity separator
9 alkalinity control agent
10 alkalinity control agent supply unit
11 nozzle
12 supply tank
13 supply pipe
14 supply pump
15 filter
16 drain
17 drain tank
18 pH sensor
19 detected pH value
21 controller
24 discharge pipe
25 mixing pump
26 impurity sensor
27 detected impurity value (detected value)
100 compressor impurity separation mechanism

The invention claimed is:

1. An apparatus for preventing corrosion of a compressor-based impurity separation mechanism wherein impurities in exhaust gas mainly composed of carbon dioxide from an oxyfuel combustor are removed, before supplying of the exhaust gas to a carbon dioxide liquefier, by the compressor-based impurity separation mechanism comprising a plurality of impurity separators having a plurality of compressors for stepwisely compressing carbon dioxide up to a target pressure for liquefaction thereof and aftercoolers for cooling the exhaust gas compressed by the respective compressors, water condensed by the cooling being discharged as drain, the apparatus comprising
   an alkalinity control agent supply unit which comprises a nozzle for spraying an alkalinity control agent upstream of a compressor in a first one of the impurity separators such that a detected pH value in the drain from the aftercooler in said first impurity separator is 5 or more to remove impurities containing at least sulfur oxides in the exhaust gas and a supply pump for supplying an alkalinity control agent stored in an supply tank to said nozzle through a filter.

2. The apparatus for preventing corrosion of the compressor-based impurity separation mechanism as claimed in claim 1 wherein said alkalinity control agent supply unit has a pH sensor for detecting pH of drain in a drain tank which stores the drain from the aftercooler in said first impurity separator, and a controller for controlling a supply amount of the alkalinity control agent by said supply pump so as to keep the pH value detected by said pH sensor to a preliminarily set value.

3. The apparatus for preventing corrosion of the compressor-based impurity separation mechanism as claimed in claim 1, wherein said alkalinity control agent supply unit has a mixing pump for mixing the alkalinity control agent from said supply tank by the supply pump with the drain from a drain tank to supply a resultant mixture to said nozzle.

4. The apparatus for preventing corrosion of the compressor-based impurity separation mechanism as claimed in claim 2, wherein said alkalinity control agent supply unit has a mixing pump for mixing the alkalinity control agent from said supply tank by the supply pump with the drain from the drain tank to supply a resultant mixture to said nozzle.

5. The apparatus for preventing corrosion of the compressor-based impurity separation mechanism as claimed in claim 1, wherein the controller is configured such that a detected value of sulfur oxides from an impurity sensor arranged downstream of the aftercooler in a downstream one of the impurity separators is inputted, and a supply of the alkalinity control agent by said alkalinity control agent supply unit is increased when the detected value of sulfur oxides from the impurity sensor exceeds a preliminarily set value.

6. The apparatus for preventing corrosion of the compressor-based impurity separation mechanism as claimed in claim 2, wherein the controller is configured such that a detected value of sulfur oxides from an impurity sensor arranged downstream of the aftercooler in a downstream one of the impurity separators is inputted, and a supply of the alkalinity control agent by said alkalinity control agent supply unit is increased when the detected value of sulfur oxides from the impurity sensor exceeds a preliminarily set value.

7. A method for preventing corrosion of a compressor-based impurity separation mechanism wherein impurities in exhaust gas mainly composed of carbon dioxide from an oxyfuel combustor are removed, before supplying of the exhaust gas to a carbon dioxide liquefier, by the compressor-based impurity separation mechanism comprising a plurality of impurity separators having a plurality of compressors for stepwisely compressing carbon dioxide up to a target pressure for liquefaction thereof and aftercoolers for cooling the exhaust gas compressed by the respective compressors, water condensed by the cooling being discharged as drain, the method comprising
spraying an alkalinity control agent upstream of the compressor in a first one of the impurity separators such that a detected pH value in the drain from the aftercooler in said first impurity separator is 5 or more, and discharging impurities containing at least sulfur oxides in the exhaust gas together with drain from the aftercooler in the first impurity separator.

* * * * *